United States Patent [19]

Taylor

[11] Patent Number: 4,515,411
[45] Date of Patent: May 7, 1985

[54] WHEEL HAVING ADJUSTMENT FOR AXIAL POSITION OF RIM RELATIVE TO DISC

[76] Inventor: Maurice Taylor, 1409 Kensington, Grosse Pointe Park, Mich. 48230

[21] Appl. No.: 408,403

[22] Filed: Aug. 16, 1982

[51] Int. Cl.³ .............................................. B60B 23/12
[52] U.S. Cl. ................................. 301/9 TV; 301/11 R
[58] Field of Search ........................ 403/476, 477, 478; 301/9 TV, 10 R, 11 R, 13 R, 13 SM

[56] References Cited

U.S. PATENT DOCUMENTS

| | | | |
|---|---|---|---|
| 2,162,696 | 6/1939 | Burger | 301/9 TV X |
| 2,175,294 | 10/1939 | Jaeger | 301/9 TV |
| 2,467,482 | 4/1949 | Hutchings | 301/9 TV |
| 2,727,789 | 12/1955 | Kanemoto | 301/9 TV |

Primary Examiner—David A. Scherbel
Attorney, Agent, or Firm—Hirons, Rogers & Scott

[57] ABSTRACT

A wheel to provide an adjustable track for a vehicle comprises a wheel disc and a rim interconnected by a plurality of circumferentially spaced connections. The connections each comprise a channel member spaced about the rim and receiving a connecting block attached to the periphery of the disc. The channel members are orientated to be parallel to the rotational axis so that forces transmitted from the disc to the rim do not induce forces along the rotational axis. Releasable stops are provided to allow the blocks to be displaced along the channel members and vary the track of the vehicle.

8 Claims, 3 Drawing Figures

WHEEL HAVING ADJUSTMENT FOR AXIAL POSITION OF RIM RELATIVE TO DISC

The present invention relates to wheels and in particular to wheels which permit the adjustment of the track of the vehicle upon which the wheel is mounted.

It is of common practice in the agricultural industry to adjust the track of a tractor to suit the spacing of the rows of the crop being cultivated. Various methods have been devised for adjusting the track such as offsetting the centre of the wheel disc to allow the disc to be reversed or by detaching the rim from the wheel disc and attaching it to the opposite side of the disc. These arrangements however are not generally desirable as the weight of the wheel or rim may prohibit effective manipulation of it and because of the need to undo and tighten the large bolts used to attach the wheel to the hub.

Other proposals have utilised a helical track welded on the radially inner surface of the wheel rim. The wheel disc is attached to the track by means of releasable clamps and upon loosening of the clamps it is possible to rotate the wheel disc to displace laterally the disc relative to the rim. Although these arrangements are widely used they are not entirely satisfactory as the clamping must occur at a location spaced from the base of the wheel rim and the clamping must be secure to prevent any creep of the disc relative to the wheel rim. The former is a problem in that the overall strength of the wheel is diminished and the latter is a problem as any creep between the disc and the rim will effectively adjust the track of the vehicle as it is being operated.

It is therefore an object of the present invention to provide a wheel in which the above disadvantages are obviated or mitigated.

According to the present invention there is provided a wheel for a vehicle, said wheel comprising a wheel disc lying transverse to the rotational axis of said wheel, a wheel rim extending around the periphery of said wheel disc and having a pair of circumferentially extending bead seats spaced apart along said rotational axis and being interconnected by a rim base, and connecting means to connect said rim to said wheel disc at a selected one of a plurality of locations spaced along said rotational axis, said connecting means comprising a plurality of pairs of circumferentially spaced abutment surfaces depending radially inwardly from said base with each of said pairs of surfaces presenting to the periphery of said disc a channel extending parallel to said rotational axis, a plurality of connecting members each located in a respective one of said channels and displacable relative to said abutment surfaces along said channel, said members extending toward and overlapping the periphery of said disc and attached thereto by fastening means and releasable stop means acting between said channels and said connecting members to secure said connecting members at a selected position in said channels whereby release of said stop means permits relative movement between said disc and said rim along said axis of rotation to vary the track of the vehicle upon which the wheel is mounted.

By utilising channels members orientated parallel to the axis of rotation the wheel the possibility of creep of the wheel disc relative to the rim is eliminated. Further the forces are transmitted to the rim adjacent the base of the channel member to increase the strength of the overall wheel assembly.

An embodiment of the invention will now be described by way of example only with reference to the accompanying drawings in which.

Figure 1:
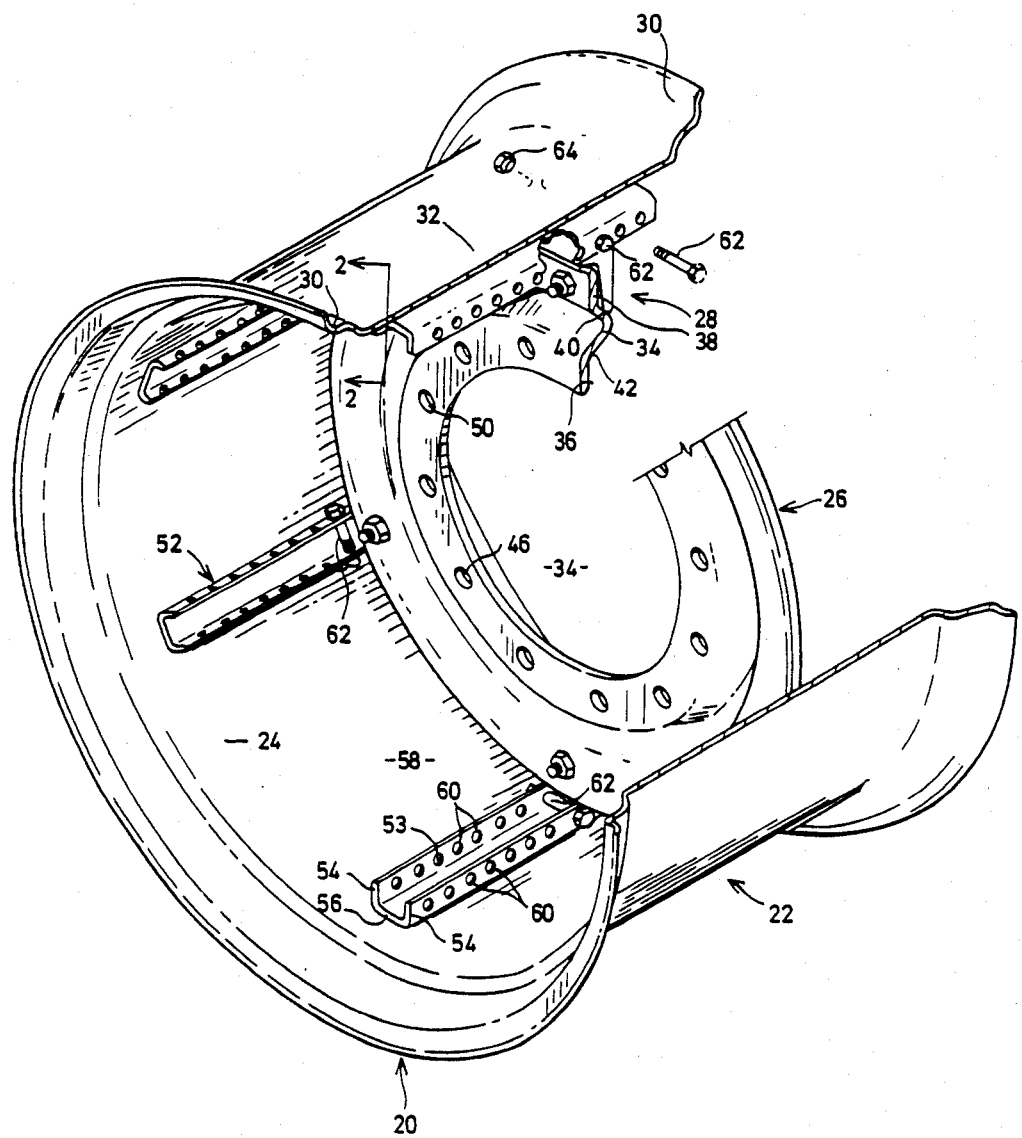
FIG. 1 is a perspective view of a wheel assembly with a portion of the wheel assembly removed for clarity.
Figure 2:
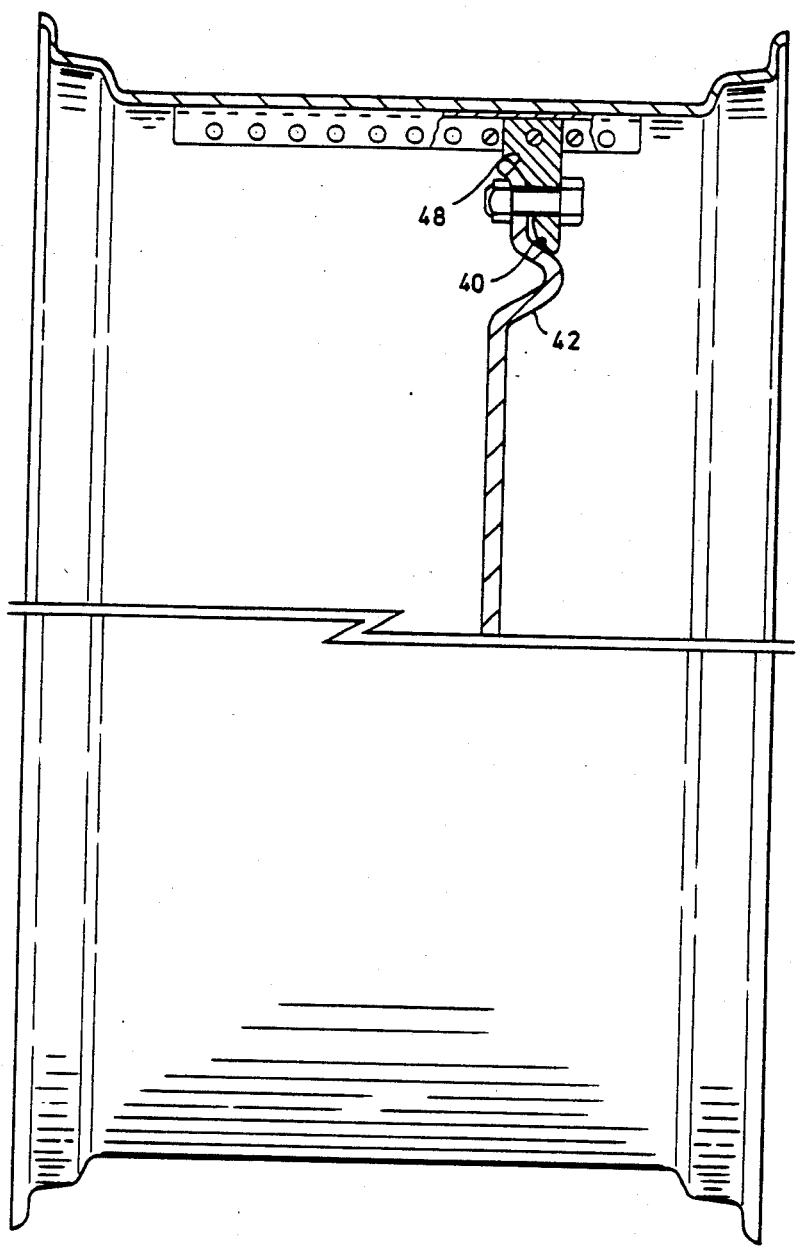
FIG. 2 is a view on the line 2—2 of FIG. 1 showing in further detail the connection of the wheel disc to the rim.
Figure 3:
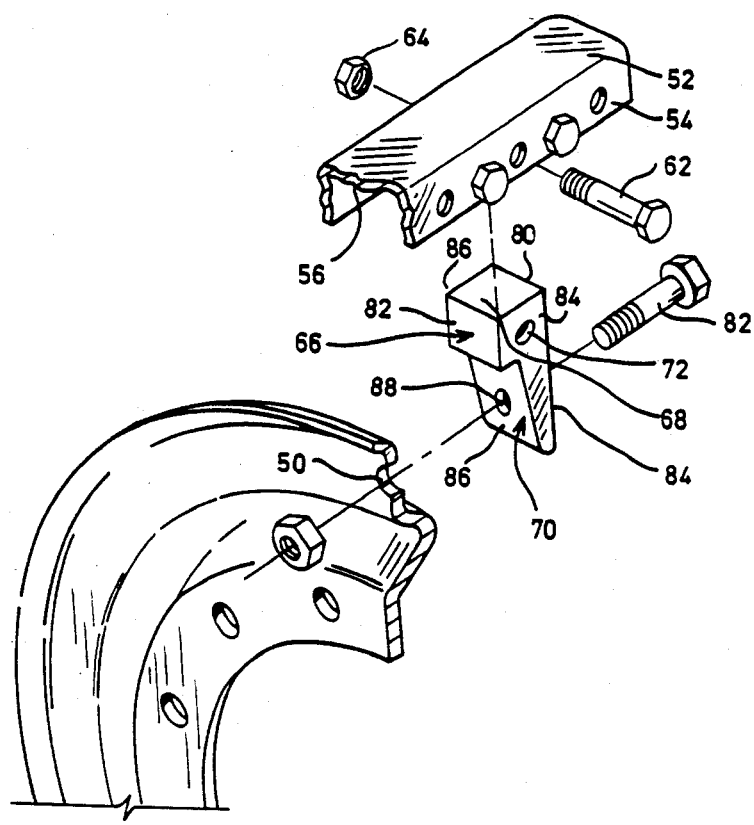
FIG. 3 is an exploded perspective view showing the components connecting the wheel disc to the rim.

Referring now to the drawings, a wheel generally designated 20 comprises a rim 22 disposed about the rotational axis 24 of the wheel and a wheel disc 26 located in a plane generally perpendicular to the rotational axis 24. Connecting means generally designated 28 connect the rim 22 to the disc 26 in the manner to be described below.

The rim 22 includes a pair of circumferentially extending bead seats 30 that are interconnected by a flat base 32.

The wheel disc 26 comprises a pair of annular flanges 36, 38 interconnected by a web 34 defined by a pair of oppositely inclined surfaces 40, 42. The radially inner edge of flange 36 defines an aperture 34 to receive the hub of the vehicle and has a series of circumferentially spaced bolt holes 46 to receive studs carried by the hub of the vehicle. The flange 38 is flared at its radially outer edge to provide an inclined surface 48 that extends in the same general direction as the surface 40. To permit attachment of the rim 22 to the disc 26. A series of circumferentially spaced bolt holes 50 are formed in the flange 38 on a common pitch circle adjacent the inclined surface 48.

The connecting means 28 comprise a plurality of channel members 52 evenly distributed about the circumference of the rim 26. Each of the channel members 52 has a pair of legs 54 interconnected by a web 56. The channel members 52 are positioned on the radially inner surface 58 of the flat base 32 with the web 56 in contact with the surface 58 and with the longitudinal axis of the channel members parallel to the rotational axis 24 of the wheel 20. The channel members 52 are secured to the surface 58 by welding or other suitable methods of securely fixing the channel members to the base without destroying its integrity and present an elongate channel 53 toward the inclined surface 48.

A series of holes 60 are drilled in each of the legs 54 of the channel members 52 at regular spaced intervals with the holes 60 in opposed legs 54 aligned to receive bolts 62 that extend between the legs 54. Each of the bolts 62 is secured to the legs 54 by means of a nut 64 and provides a releasable stop means on the channel member 52.

The disc 26 is connected to the channel members 52 by means of connecting blocks 66. The blocks 66 include a head 68 that is received within the channel 53 between the legs 54 and a tang 70 depending from the head 68. The head 68 is generally square in cross section with a pair of end faces 80–82 and a pair of side faces 84–86. A bore 72 extends through the head 68 between the side faces 76–78 and corresponds in diameter to the hole 60 provided in the legs 54 of channel members 52. The bore 72 is located so as to be aligned with the holes 60 and thereby permit one of the bolts 52 to pass through the head and secure the block to the channel members 52.

The tang 70 depends from the head 68 and tapers in a direction away from the head 68. The tang is defined by a pair of converging surfaces 84–86 one of which, 84 is a continuation of the end face 80. The surface 86 extends from the end face 82 and is slightly concave adjacent the end face 82 to conform to the inclined surface 48 of the annular flange 38. The lower end of surface 86 is radiused to merge smoothly with the surface 84 and provide a rounded abutment surface that contacts the inclined surface 42. A bore 88 is formed in the tang in a direction parallel to the rotational axis of the wheel and is arranged to be aligned with one of the holes 50 provided in the annual flange 38. To attach the block 66 to the disc 26 a bolt 92 passes through the bore 88 and hole 50 and is secured by means of a nut 94.

In operation the wheel disc 26 is secured to the rim by supporting the vehicle in an elevated position so that the wheel 20 is clear of the ground. In this position and with the bolt 92 loose and bolts 62 removed the rim 22 may be displaced in the direction of the rotational axis 24 until the head 68 of the connecting block 66 is aligned with an appropriate one of the holes 60 in the legs 54 of the channel member 52. Bolts 62 are then passed through the bore 72 in the head 68 and through the aligned holes 60 in the legs 54. Bolts 62 are also located on opposite sides of the head to provide a positive stop for the connecting block 66. The bolt 92 is then tightened causing the radiused portion of the surface 86 to bear against the inclined surface 42. This forces the head of the block into the channel 53 to abut against the underside of the web 56. The bolt 62 may then be tightened. This procedure is followed progressively at diametrically opposed clamping blocks 66 so that the wheel disc 26 is effectively centred relative to the wheel rim 22. With the disc 26 secured to the rim, the load from the disc to the rim is transferred adjacent the base of the wheel rim and is transferred over a large area to provide maximum integrity for the wheel 20. Moreover, the disposition of the channel members 53 inhibits substantial forces in the direction of the axis 24 from being generated.

In order to adjust the track of the vehicle it is simply necessary to support the wheel 20 off the ground and to remove the bolt 62 passing through the head 68 and loosen the bolt 92. The bolts 62 on one side of the head 68 is also removed to permit displacement of the head in the channel 53. This bolt 62 may be mnoved either to the extremity of the channel member 52 or to the new location for the block 66. The rim 22 may then be displaced relative to the disc 26 to move the blocks 66 relative to their respective channel members 52 and bring the bores 72 into alignment with the desired one of the holes 60. The relative disposition of the rim 22 and the vehicle hub is then varied and the effective track of the vehicle changed.

The number of channel members 52 required will depend to some extent on the load and horsepower of the tractor. The number of channels can vary from four up to sixteen but if very high loads are required conceivably more channels could be utilised. At least two of the channel members 52 must be provided with the holes 60 in their legs to provide a positive lateral location for the wheel rim. If only two such channel members are used, they should be located 180° apart to provide the self centering action of the rim on the disc. In the event that not all the channel members 52 are provided with holes it will be apparent that torque may still be transmitted through the connecting block to the channels 52 although these blocks will not contribute significantly to the lateral stability of the wheel rim relative to the disc.

It will be seen therefore that an extremely simple, convenient and sturdy wheel is provided which permits adjustment of the track of the vehicle whilst obviating or mitigating some of the disadvantages associated with the prior art.

I claim:

1. A wheel for a vehicle, said wheel comprising a wheel disc lying transverse to the rotational axis of said wheel and having a radially outer peripheral portion, a wheel rim extending around the peripheral portion of said wheel disc and having a pair of circumferentially extending bead seats spaced apart along said rotational axis and interconnected by a rim base having an inwardly directed peripheral portion, and connecting means to connect said rim to said wheel disc at a selected one of a plurality of locations spaced along said rotational axis, said connecting means including a plurality of channel members connected to one of said peripheral portions at circumferentially spaced locations, each channel member comprising a pair of circumferentially spaced abutment surfaces extending radially from said one peripheral portion with each of said pairs of surfaces defining a channel extending parallel to said rotational axis, a plurality of connecting members each snugly received in a respective one of said channels between said abutment surfaces and displacable relative to said abutment surfaces along said channel, said members extending toward the other of said peripheral portions and being attached thereto by fastening means and releasable stop means acting between said channels and said connecting members to secure said connecting members at a selected position in said channels with said connecting members in abutment with said abutment surfaces to transmit torque applied to rotate said wheel about said rotational axis, release of said stop means permitting relative movement between said disc and said rim along said axis of rotation to vary the track of the vehicle upon which the wheel is mounted.

2. A wheel according to claim 1 wherein said spaced abutment surfaces are constituted by legs of a channel member secured to the radially inner surface of said rim base.

3. A wheel according to claim 2 wherein said releasable stop means includes a pin and plurality of spaced holes formed in each leg of said channel member, each of the holes in one of said legs being coaxial with a corresponding hole in the other leg to enable said pin to extend between said legs.

4. A wheel according to claim 3 wherein said connecting members include a head received in said channel and having a bore extending therethrough for alignment with one of said holes in each leg to permit said pin to pass through said head and secure said connecting member to said channel member.

5. A wheel according to claim 4 wherein said connecting member further comprises a tang extending from said head and having an inclined surface in engagement with the periphery of said disc whereby tightening of said fastening means induces movement of said connecting member radially outward.

6. A wheel according to claim 5 wherein said disc includes a pair of annular flanges inteconnected by a web, said web having an inclined surface, said tang engaging said inclined surface to induce said radially outward movement.

7. A wheel according to claim 6 wherein the radially outer of said flanges is flared at the periphery of said disc.

8. A wheel according to claim 7 wherein said fastening means comprises a bolt for each of said connecting members extending through said radially outer flange between said web and said flared portion of said flange.

* * * * *